US012589672B2

(12) United States Patent
Hafez et al.

(10) Patent No.:  US 12,589,672 B2
(45) Date of Patent:      Mar. 31, 2026

(54) METHOD FOR OPERATING A BATTERY CHARGING ASSISTANCE SYSTEM EXTERNAL TO A MOTOR VEHICLE, AS WELL AS A BATTERY CHARGING ASSISTANCE SYSTEM

(71) Applicant: MERCEDES-BENZ GROUP AG, Stuttgart (DE)

(72) Inventors: Bahaaeldeen Hafez, Canton, MI (US); Prajakta Pimple, Southfield, MI (US); Venkata Sai Durga Makkapati, Farmington Hills, MI (US); Mohamad Abdul-Hak, Ann Arbor, MI (US)

(73) Assignee: MERCEDES-BENZ GROUP AG, Stuttgart (DE)

( * ) Notice: Subject to any disclaimer, the term of this patent is extended or adjusted under 35 U.S.C. 154(b) by 789 days.

(21) Appl. No.: 17/908,981

(22) PCT Filed: Feb. 17, 2021

(86) PCT No.: PCT/EP2021/053924
§ 371 (c)(1),
(2) Date: Sep. 2, 2022

(87) PCT Pub. No.: WO2021/175596
PCT Pub. Date: Sep. 10, 2021

(65) Prior Publication Data
US 2023/0094609 A1     Mar. 30, 2023

(30) Foreign Application Priority Data
Mar. 5, 2020   (GB) ...................................... 2003192

(51) Int. Cl.
*H02J 7/00*       (2026.01)
*B60L 53/66*      (2019.01)
(Continued)

(52) U.S. Cl.
CPC ............. *B60L 53/665* (2019.02); *B60L 53/68* (2019.02); *G06Q 10/02* (2013.01); *B60L 2240/62* (2013.01)

(58) Field of Classification Search
USPC ......................................................... 320/109
See application file for complete search history.

(56) References Cited

U.S. PATENT DOCUMENTS 11,340,083 B2     5/2022  Wilding et al.
2013/0339072 A1   12/2013  Touge
(Continued)

FOREIGN PATENT DOCUMENTS

CN        102377220 A      3/2012
CN        103262112 A      8/2013
(Continued)

OTHER PUBLICATIONS

Office Action dated Sep. 1, 2020 in related/corresponding GB Application No. GB2003192.8.
(Continued)

*Primary Examiner* — Samuel Berhanu
(74) *Attorney, Agent, or Firm* — PATENT PORTFOLIO BUILDERS PLLC

(57)             ABSTRACT

A method for operating a battery charging assistance system external to a motor vehicle involves the motor vehicle transmitting a charging request and an actual position of the motor vehicle to the battery charging assistance system. Depending on the position and the charging request, the battery charging assistance system chooses one battery charging station and the one battery charging station is reserved from the battery charging assistance system by transmitting a reservation signal to the one battery charging station. If the one battery charging station is occupied by a further electrical operated motor vehicle, a leaving message
(Continued)

is computed and transmitted to the further motor vehicle in order to ask the further motor vehicle to leave the one battery charging station and if the further motor vehicle is leaving a compensation action for the further motor vehicle is initiated.

5 Claims, 4 Drawing Sheets

(51) Int. Cl.
  *B60L 53/68*          (2019.01)
  *G06Q 10/02*          (2012.01)

(56)                    References Cited

U.S. PATENT DOCUMENTS

| | | | |
|---|---|---|---|
| 2016/0264011 A1 | 9/2016 | Yasukawa et al. | |
| 2016/0364658 A1 | 12/2016 | Khoo et al. | |
| 2018/0281612 A1 | 10/2018 | Perry et al. | |
| 2019/0126765 A1* | 5/2019 | Seo | B60L 53/36 |
| 2019/0139107 A1 | 5/2019 | Khoo et al. | |
| 2019/0139161 A1 | 5/2019 | Sakuma et al. | |
| 2019/0143828 A1* | 5/2019 | Sawada | G06Q 10/02 |
| | | | 340/934 |
| 2019/0202315 A1 | 7/2019 | Wilding et al. | |

FOREIGN PATENT DOCUMENTS

| | | | | |
|---|---|---|---|---|
| CN | 108781351 A | | 11/2018 | |
| DE | 102016005630 A1 | | 11/2017 | |
| DE | 102019002450 A1 | | 11/2019 | |
| JP | 2011083166 A | | 4/2011 | |
| JP | 2012048286 A | | 3/2012 | |
| JP | 2012215923 A | | 11/2012 | |
| JP | 2013020346 A | | 1/2013 | |
| JP | 2014149611 A | | 8/2014 | |
| JP | 2016218648 A | | 12/2016 | |
| JP | 2018049447 A | | 3/2018 | |
| JP | 2019087087 A | | 6/2019 | |
| KR | 20190057471 A | * | 5/2019 | ........... B60L 53/305 |
| WO | 2008132520 A1 | | 11/2008 | |
| WO | 2013057587 A2 | | 4/2013 | |
| WO | 2014118852 A1 | | 8/2014 | |

OTHER PUBLICATIONS

Notice of Reasons for Refusal dated Sep. 19, 2023 in related/corresponding JP Application No. 2022-550228.

Office Action dated Apr. 3, 2024 in related/corresponding Korean Application No. 10-2022-7027121.

International Search Report and Written Opinion mailed May 31, 2021 in related/corresponding International Application No. PCT/EP2021/053924.

Office Action dated Feb. 26, 2025 in related/corresponding CN Application No. 202180018723.2.

Office Action dated Jun. 25, 2025 in related/corresponding CN Application No. 202180018723.2.

\* cited by examiner

METHOD FOR OPERATING A BATTERY CHARGING ASSISTANCE SYSTEM EXTERNAL TO A MOTOR VEHICLE, AS WELL AS A BATTERY CHARGING ASSISTANCE SYSTEM

FIELD OF THE INVENTION

Exemplary embodiments of the invention relate to a method for operating a battery charging assistance system external to a motor vehicle for the at least partially electrical operated motor vehicle, as well as to a battery charging assistance system.

BACKGROUND INFORMATION

According to the state of the art, it is known that a driver of an at least partially electrically operated motor vehicle, which can also be noted as an electric vehicle, usually plans the driving and charging stops based on the existing high voltage battery state of charge of the at least partially electrically operated motor vehicle. Therefore, it is known that the at least partially electrically operated motor vehicle comprises an electrical energy storage with high voltage, which is also known as a battery. The driving and charging is based on the state of charge (SOC) and the estimated SOC during the trips and at every destination. While driving, the actual SOC may vary, usually lower, for example, due to a low outside temperature or driver driving behavior, from the estimated values, which results in the high voltage battery depleting faster than expected and the at least partially electrically operated motor vehicle has a lower remaining range. This may result in the driver not being able to reach their destination and requires recharging the battery to reach the final destination. In the event the driver cannot secure a nearby charger due to the motor vehicle charging stations being at capacity, the vehicle may end up stopping on the road and requiring roadside assistance that is costly and time consuming.

US 2013/0339072 A1 discloses a method for battery charge scheduling for an electric vehicle including a position confirming step for confirming a position of the vehicle, a candidate station obtaining step for obtaining information on position of the candidate battery charge station, a waiting time and a battery charge cost, a candidate battery charge station displaying step for displaying the information of the candidate battery charge stations, a candidate battery charge station selecting step for selecting a candidate battery charge station at which a battery charge is desired to be carried and a battery charge reserving step for reserving the battery charge at the candidate battery charge station through the station control network based on a setting at the candidate battery charge station selecting step through the in-vehicle information device.

DE 10 2016 005 630 A1 discloses a data processing unit comprising a first interface for exchanging first information with at least one motor vehicle and a second interface for exchanging second information with a multiplicity of charging stations for charging an energy storage device of a motor vehicle, the first interface being designed to exchange information with a multiplicity of motor vehicles, and the data processing unit being designed, upon receipt of first information, which relates to a state of charge at a time of a desired charging of the energy storage device and a maximum charging power of at least one motor vehicle, and second information which relates to a charging power available at a predeterminable time at at least one charging station, a strategy is produced in which a specific motor vehicle is assigned a specific charging station and a time of a start of charging, taking into account at least one predeterminable parameter.

WO 2013/057 587 A2 discloses a method for managing the charging of an electric vehicle. The method includes receiving a request for a charge transfer for an electric vehicle over a network link between an electric vehicle charging station and a cloud server. The network link has a mobile device disposed between the electrical vehicle charging station and the cloud server for facilitating communication between the charging station and the cloud server.

SUMMARY OF THE INVENTION

Exemplary embodiments of the invention provide a method and a battery charging assistance system, by which a more comfortable way and a more reliable way of charging a battery of an at least partially electrical operated motor vehicle can be realized for a driver of the motor vehicle.

One aspect of the invention relates to a method for operating a battery charging assistance system external to a motor vehicle for the at least partially electrically operated motor vehicle, by which a charging request and an actual position of the motor vehicle are transmitted from the motor vehicle to the battery charging assistance system by a first communication network and depending on the position and the charging request, the battery charging assistance system chooses one battery charging station out of a plurality of battery charging stations and the one battery charging station is reserved from the battery charging assistance system by transmitting a reservation signal to the one battery charging station by a second communication network.

It is provided that if the one battery charging station is occupied by an other at least partially electrically operated motor vehicle, a leaving message is computed from the one battery charging station and/or the battery charging assistance system and transmitted to the other motor vehicle in order to ask the other motor vehicle to leave the one battery charging station and if the other motor vehicle is leaving the one battery charging station, a compensation action for the other motor vehicle is initiated by the battery charging assistance system.

Therefore, a secure charging of the at least partially electrically operated motor vehicle can be realized, in particular if the at least partially electrically operated motor vehicle has reached a critical state of charge. Therefore, a more comfortable method for charging the at least partially electrically operated motor vehicle as well as more reliable way for charging for a driver can be realized.

In particular, the at least partially electrically operated motor vehicle is a full electrically operated motor vehicle and can also be called an electric vehicle. The motor vehicle may also be called requesting motor vehicle and the other motor vehicle may also be called responding other motor vehicle.

Furthermore, it is facilitated, that if, for example, the SOC-level is not enough for the motor vehicle to reach its destination and only enough to make it to a close public battery charging station, the battery charging assistance system can detect when the motor vehicle reaches this critical state of charge and secure/reserve a charging spot for the motor vehicle to charge to continue its route. In the case that the nearby battery charging stations are in use, the battery charging assistance system, which can be, for example, a back-end server from the original equipment manufacturer, can negotiate with other original equipment manufacturer back-ends or the operator of the battery charging station's back-end to free one of the battery charging stations at the identified public charging stations, giving higher preference to high power/quick charging and the closet to the battery charging station's location. Stakeholders should share incentives amongst them to derive collaboration towards the implementation. Therefore, it is facilitated that a cost saving for drivers can be realized as it avoids costly roadside assistance services for when the electric vehicle is out of charge. Furthermore, time saving and convenience for the electric vehicle's drivers can be realized by avoiding vehicle stopping on the road due to a situation where the high voltage battery of the electric vehicle is out of charge.

In an advantageous form of an embodiment, a connection sensor of at least the one battery charging station is capturing a connection and/or a disconnection of the other motor vehicle at the one battery charging station. Therefore, it is possible that an occupied battery charging station or a free battery charging station can be detected by the battery charging assistance system. Furthermore, it can be realized that if the one battery charging station is occupied, the one battery charging station can detect a disconnection of the other motor vehicle and, for example, send this information to the battery charging assistance system, such that the one battery charging station is free and able to charge the at least partially electrically operated motor vehicle. Therefore, a reliable method for operating the battery charging assistance system can be realized.

Furthermore, it is advantageous if a connection status of the at least one battery charging station is transmitted to the battery charging assistance system. In particular, the connection status of the plurality of the battery charging stations are transmitted to the battery charging system. Therefore, it is possible that, for example, a free battery charging station can be reserved for the at least partially electrically operated motor vehicle with the critical state of charge. If there is no free battery charging station, for example, a disconnection as the connection status can also be transmitted to the battery charging assistance system in order to inform the battery charging assistance system that the one battery charging station is now free and the compensation action has to be initiated for the leaving other motor vehicle.

In another embodiment, a state of charge of a battery of the motor vehicle is monitored by an electronical computing device of the motor vehicle and depending on the monitored state of charge, the charging request is transmitted to the battery charging assistance system. Therefore, the battery charging assistance system knows exactly the amount of electrical power the at least partially electrically operated motor vehicle needs. For example, according to the state of charge, a distance to the next possible battery charging station can be determined. For example, if the state of charge is very critical, the next battery charging station has to be reserved by the battery charging assistance system. If the state of charge is high enough to reach the battery charging station further away, this battery charging station can be reserved, for example, if the battery charging station at the position of the at least partially electrically operated motor vehicle is occupied. Furthermore, the destination time of the at least partially electrically operated motor vehicle at the battery charging station can be determined by the battery charging assistance system and, for example, according to the destination time the one battery charging station can be reserved for the motor vehicle. Therefore, a better charging for a plurality of at least partially electrically operated motor vehicles can be realized.

In another advantageous embodiment of the invention, the charging request is transmitted when a predefined state of charge threshold of the state of charge of the battery is reached and monitored by the electronical computing device. For example, if the state of charge is at a critical point, which is the threshold, the charging request is transmitted to the battery charging assistance system. For example, this threshold can be 20% of the maximum state of charge. Therefore, if the state of charge is under the 20% the charging request can be transmitted to the battery charging assistance system.

Furthermore, it has turned out to be advantageous if an actual route of the motor vehicle, which is provided by a navigation device of the motor vehicle, such as a global position system (GPS) device, is taken into consideration by choosing the one battery charging station out of the plurality of battery charging stations by the battery charging assistance system. Therefore, it is possible that just battery charging stations that are in some threshold of vicinity of the vehicle, are taken into consideration in order to choose the battery charging station. Therefore, a time saving and convenient charging of the battery of the motor vehicle can be realized.

In another embodiment, the compensation action covers a payment for the other motor vehicle and/or a cheaper charging fee for a current charging and/or a future charging for the other motor vehicle and/or a discount on a system for the battery charging assistance system. For example, if the other motor vehicle is associated with the same original equipment manufacturer (OEM) back-end, the responding original equipment manufacturer back-end could provide a discount rate for its original equipment manufacturer service package or even future free critical charging service. For example, if the other motor vehicle is associated with an alternative original equipment manufacturer back-end, it is assumed that it is uncompensated through the alternative OEM back-end, and it is assumed that in order to be compensated through the alternative OEM back-end, that the alternative OEM back-end must be incentivized through requesting a relation with the original equipment manufacturer. Furthermore, the responding battery charging station could provide a discount for current/future charging sessions if the other motor vehicle agrees to end its charging session and leaves its charging spot. In such a case, a user convenient compensation action for the other motor vehicle can be realized.

In a further advantageous embodiment, after the transmission of the leaving message to the other motor vehicle, a user of the other motor vehicle is asked to confirm the leaving and the confirmation is transmitted to the battery charging assistance system. For example, the user of the other motor vehicle can confirm that they want to leave the battery charging station and receive a compensation action in return. Therefore, after the leaving message is received by the user of the other motor vehicle, the user can confirm that they want to leave and receive the compensation action. Therefore, an improved planning for the battery charging assistance system can be realized.

In a further embodiment, after the reservation of the one battery charging station, a reservation confirmation is transmitted to the requesting motor vehicle. In other words, after the reservation of the battery charging assistance system is completed, the driver or the user of the requesting motor vehicle gets a reservation confirmation that the one battery charging station is now free for the motor vehicle. Therefore, a time saving and convenience for the user of the motor vehicle can be realized.

Another aspect of the invention relates to a battery charging assistance system external to a motor vehicle for the at least partially electrically operated motor vehicle, with at least a communication device, wherein the battery charging assistance system is configured to perform a method to the preceding aspect. In particular, the method is performed by the battery charging assistance system. In one embodiment, the battery charging assistance system may be an OEM back-end.

Advantageous forms of configuration of the method are to be regarded as advantageous forms of the battery charging assistance system. Therefore, the battery charging assistance system comprises means for performing the method.

Further advantages, features, and details of the invention derive from the following description of preferred embodiments as well as from the drawings. The features and feature combinations previously mentioned in the description as well as the features and feature combinations mentioned in the following description of the figures and/or shown in the figures alone can be employed not only in the respectively indicated combination but also in any other combination or taken alone without leaving the scope of the invention.

BRIEF DESCRIPTION OF THE DRAWINGS

The drawings show in.

In the figures the same elements or elements having the same function are indicated by the same reference signs.

DETAILED DESCRIPTION

Figure 1:
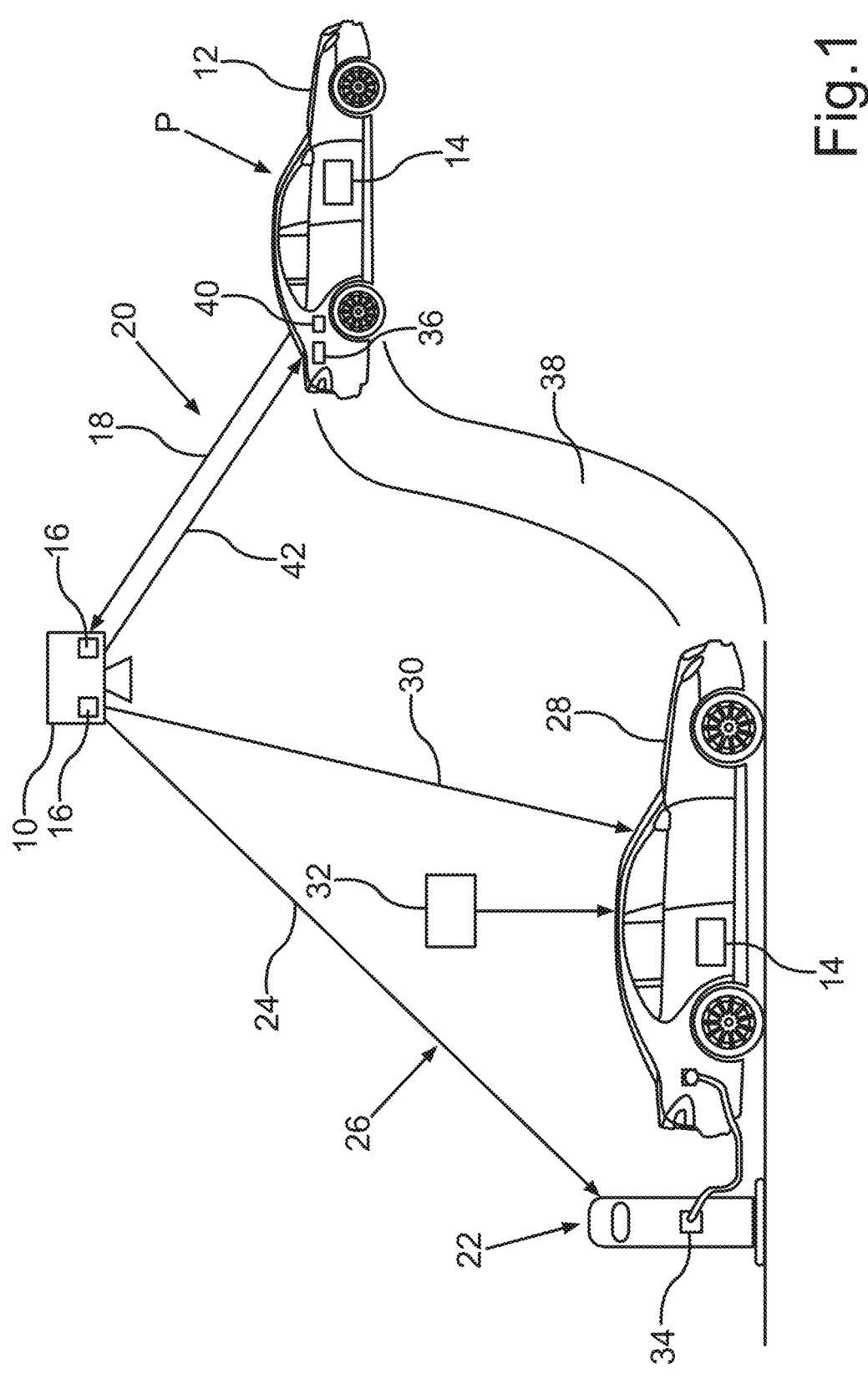
FIG. 1 a schematic side view of an embodiment of a battery charging assistance system.

FIG. 1 shows in a schematic side view an embodiment of a battery charging assistance system 10. The battery charging assistance system is external to a motor vehicle 12, wherein the motor vehicle 12 is at least partially electrically operated. In particular, the motor vehicle 12 is fully electrically operated such that the motor vehicle 12 can comprise a battery 14 which can be, in particular, a high voltage battery. The battery charging assistance system 10 at least comprises a communication device 16.

A method for operating the battery charging assistance system 10 can be realized through the battery charging assistance system 10. A charging request 18 and an actual position P of the motor vehicle 12 are transmitted from the motor vehicle 12 to the battery charging assistance system 10 by a first communication network 20. This communication network 20 can be, for example, a mobile network. Depending on the position P and the charging request 18, the battery charging assistance system 10 may choose a battery charging station 22 out of a plurality of battery charging stations and the one battery charging station 22 is reserved from the battery charging assistance system 10 by transmitting a reservation signal 24 to the one battery charging station 22 by a second communication network 26. The second communication network 26 can be, for example, a mobile network.

It is provided that if the one battery charging station 22 is occupied by a other at least partially electrical operated motor vehicle 28, which is also referred to as other motor vehicle 28, a leaving message is computed from the one battery charging station 22 and/or the battery charging assistance system 10, which is shown in FIG. 1, and transmitted to the other motor vehicle 28 in order to ask the other motor vehicle 28 to leave the one battery charging station 22 and if the other motor vehicle 28 is leaving the one battery charging station 22, a compensation action 32 for the other motor vehicle 28 is initiated by the battery charging assistance system 10.

FIG. 1 shows further that a connection sensor 34 of the at least one battery charging station 22 is detecting a connection and/or a disconnection of the other motor vehicle 28 at the one battery charging station 22. In particular, a connection status of the at least one battery charging station 22 is transmitted to the battery charging assistance system 10.

In particular, a state of charge of the battery 14 of the motor vehicle 12 is monitored by an electronical computing device 36 of the motor vehicle 12 and depending on the monitored state of charge, the charging request 18 is transmitted to the battery charging assistance system 10. In particular, the charging request 18 is transmitted when a predefined state of charge threshold of the state of charge of the battery 14 is reached and monitored by the electronical computing device 36.

FIG. 1 shows further that an actual route 38 of the motor vehicle 12, which is provided by a navigation device 40 of the motor vehicle 12, is taken into consideration by choosing the one battery charging station 22 out of the plurality of battery charging stations by the battery charging assistance system 10.

The compensation action 32, for example, covers a payment for the other motor vehicle 28 and/or a cheaper charging fee for a current charging and/or a future charging for the other motor vehicle 28 and/or a discount on a system of the battery charging assistance system 10.

Furthermore, FIG. 1 shows that after the transmission of the leaving message 30 to the other motor vehicle 28, a user of the other motor vehicle 28 is asked to confirm the leaving and the confirmation is transmitted to the battery charging assistance system 10. Furthermore, it is shown that after the reservation of the one battery charging station 22 a reservation confirmation 42 is transmitted to the motor vehicle 12.

Figure 2A:
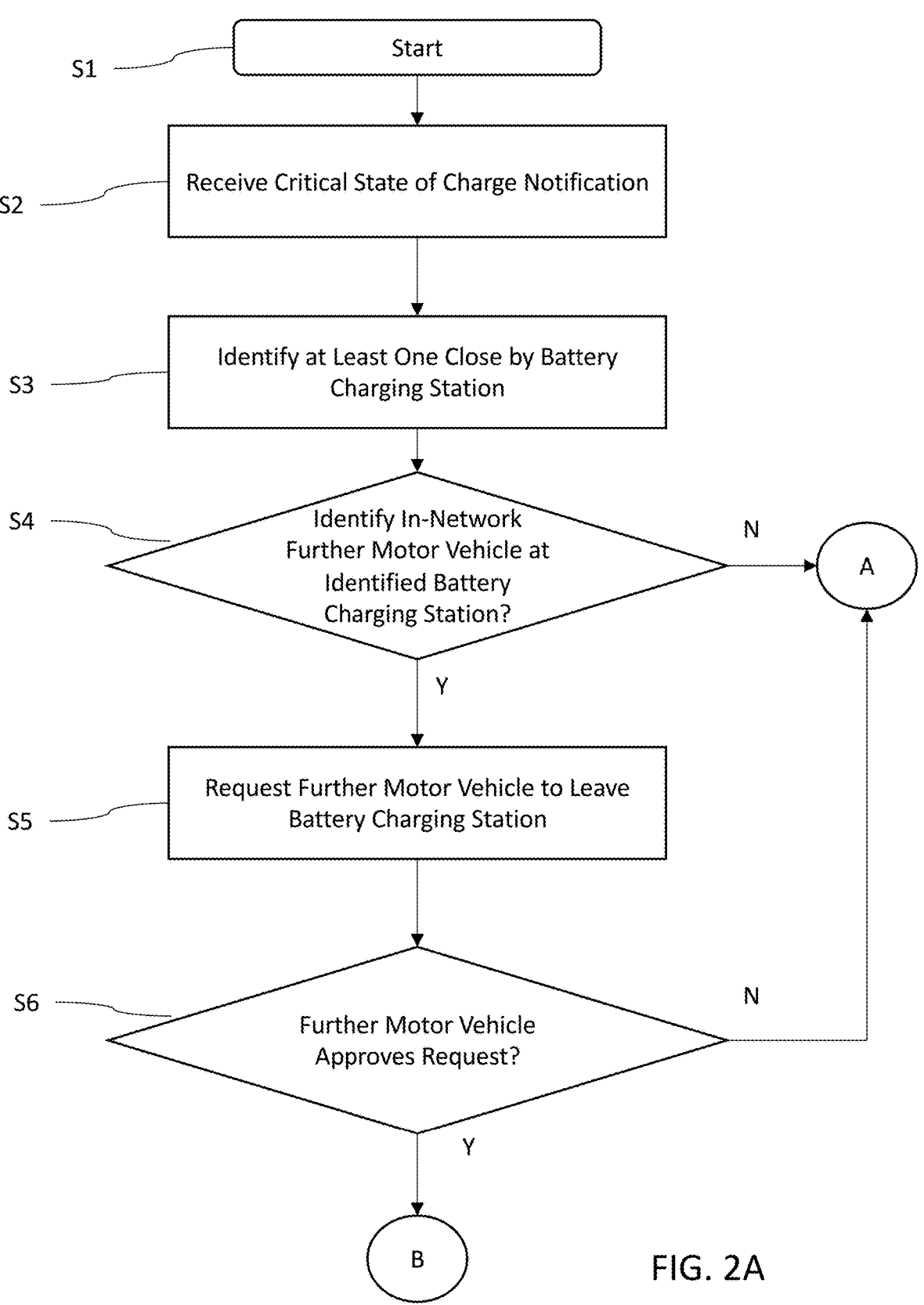
FIGS. 2A-2C illustrate a schematic flow chart of a method according to an embodiment of the invention.
Figure 2B:
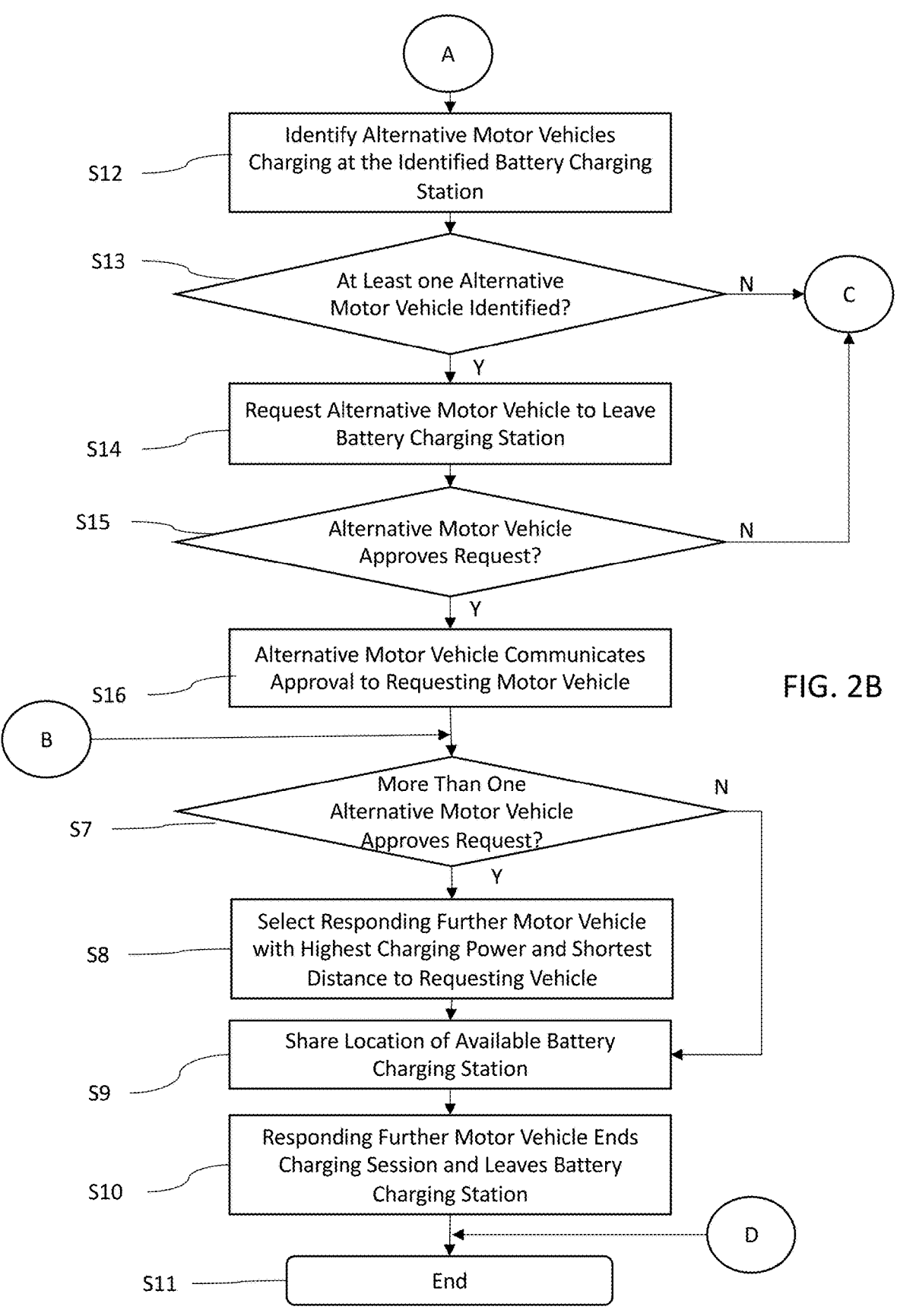
Figure 2C:
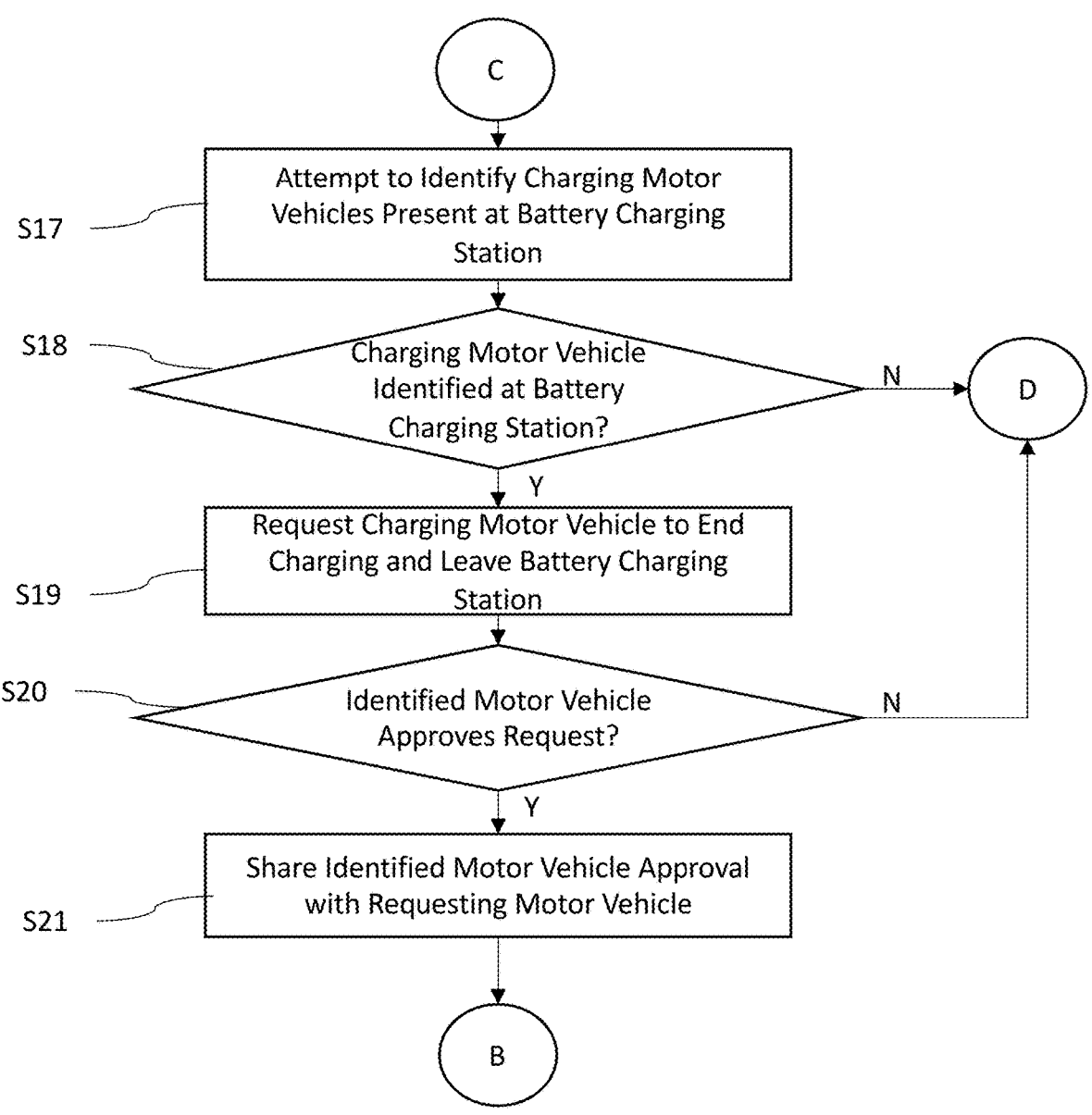

FIGS. 2A-2C show a schematic flow chart according to an embodiment of the method. In a first step S1 the method starts. In a second step S2, the battery charging assistance system 10, which can also be called an original equipment manufacturer (OEM) back-end, receives from the motor vehicle 12 a critical state of charge notification. In a third step S3, the OEM back-end 10 identifies at least one close by battery charging station 22. In a fourth step S4, an OEM back-end 10 requests to identify at least one in-network other motor vehicle 28 charging at the battery charging station 22. If the at least one in-network other motor vehicle 28 is charging at the at least one identified battery charging station 22, a fifth step S5 is performed, where the OEM back-end 10 requests to identify the at one least in-network other motor vehicle 28 and requests that the at least identified in-network other motor vehicle 28 ends the charging session. In the fifth step S5, the OEM backend may request the at least one identified in-network other motor vehicle 28 to leave the battery charging station 22, thereby ending the charging session of the at least one identified other motor vehicle 28, by providing the motor vehicle's 12 arrival time to the at least one battery charging station 22 and providing a compensation action 32, which may also be referred to as an incentive, to the at least one identified other motor vehicle 28. The method then proceeds to a sixth step S6 where the at least one other motor vehicle 28, also referred to as the responding vehicle, approves the request.

If the responding other motor vehicle 28 agrees to end the charging session, the method goes to a seventh step S7, where it is determined by the OEM back-end 10 if there are more than one responding other motor vehicle 28. If there are more than one responding other motor vehicle 28 that approved the request by the requesting motor vehicle 12, the method proceeds to an eighth step S8, in which the OEM back-end 10 selects the responding other motor vehicle 28 at a battery charging station 22 with the highest charging power and shortest distance to the requesting vehicle 12. From the eighth step S8 a ninth step S9 is performed, where the OEM back-end 10 shares the location of the available battery charging station 22 with the requesting motor vehicle 12 and confirms that the selected responding other motor vehicle 28 will end the charging session by at least the time of arrival of the requesting vehicle 12 at the battery charging station 22. From the seventh step S7, if there is just one responding other motor vehicle 28, the method proceeds from the seventh step S7 to the ninth step S9. Coming from the ninth step S9, a tenth step S10 is provided wherein the responding other motor vehicle 28 ends the charging session, leaves the battery charging station 22 and the requesting motor vehicle 12 arrives to the battery charging station 22, and incentives are distributed by the charging assistance system 10 as per the compensation action 32. In an eleventh step S11, the method ends.

Coming from the fourth step S4, if there is no in-network other motor vehicle 28 charging at the at least one identified battery charging station 22, the responding other motor vehicle 28, through the OEM back-end 10, identifies alternative motor vehicles, which may be out-of-network motor vehicles, charging at the at least one identified battery charging station 22 in a twelfth step S12. The twelfth step S12 can also be performed after the sixth step S6, if, for example, the at least one responding in-network other motor vehicle 28 disagrees to end the charging session. After the twelfth step S12, a thirteenth step S13 is performed, wherein the identification of at least one out-of-network vehicle charging close by is performed by the responding other motor vehicle 28 through the OEM back-end 10. If the OEM back-end 10 identifies at least one out-of-network motor vehicle charging at the at least one identified battery charging station 22, a fourteenth step S14 is performed. In the fourteenth step S14, the responding other motor vehicle 28, through the OEM back-end 10, requests that the at least one identified out-of-network motor vehicle ends their charging session and leave the charging station 22 by providing the requesting motor vehicle 12 arrival time and a compensation action 32. From the fourteenth step S14, a fifteenth step S15 is performed, wherein the responding out-of-network vehicle approves the request. If the responding out-of-network vehicle agrees to end the charging session, a sixteenth step S16 is performed, wherein the responding other motor vehicle 28, through the OEM back-end 10, communicates the responding out-of-network vehicle approval with the requesting motor vehicle 12 through the OEM back-end 10. After the sixteenth step S16, the seventh step S7 can be performed.

Coming from the thirteenth step S13, if there is no out-of-network motor vehicle charging at the identified battery charging station 22, a seventeenth step S17 is performed, wherein the at least one responding battery charging station 22 back-end attempts to identify charging motor vehicles present at the at least one battery charging station 22. In an eighteenth step S18, the at least one battery charging station 22 back-end is confirming the identification of at least one motor vehicle at the at least one charging station 22. If, in the eighteenth step S18, at least one motor vehicle is confirmed to be charging at the at least one battery charging station 22, a nineteenth step S19 is performed. In the nineteenth step, the responding battery charging station 22 back-end requests the at least one identified charging motor vehicle to end charging and leave by providing the requesting motor vehicle 12 arrival time at the at least one identified battery charging station 22 and providing a compensation action 32. After the nineteenth step S19, a twentieth step S20 is performed, wherein the at least one identified vehicle is approving the request. If the at least one identified motor vehicle approves to end the charging session, a twenty-first step S21 is performed, wherein the at least one identified battery charging station 22 back-end shares the at least one identified motor vehicle approval to the requesting motor vehicle 12 through the OEM back-end 10. After the twenty-first step S21, the seventh step S7 can be performed.

Coming from the fifteenth step S15, if the responding out-of-network vehicle disagrees to end the charging session, the seventeenth step S17 can be performed.

Coming from the eighteenth step S18, if there is no charging motor vehicle identified at the battery charging station 22, or, coming from the twentieth step S20, if the charging motor vehicle disagrees to end the charging session, the eleventh step S11, in other words, the end of the method, is performed.

FIG. 1 and FIG. 2 show an electric vehicle's critical charging service.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for operating a battery charging assistance system external to an at least partially electrically operated motor vehicle, the method comprising:

monitoring, by an electronic computing device of the at least partially electrically operated motor vehicle, a state of charge of a battery of the at least partially electrically operated motor vehicle;

transmitting, by the at least partially electrically operated motor vehicle and depending on the monitored state of charge of the battery of the at least partially electrically operated motor vehicle, a charging request to the battery charging assistance system, wherein the charging request is transmitted when a predefined state of charge threshold of the state of charge of the battery is reached and monitored by the electronic computing device, wherein the predefined state of charge threshold is a value corresponding to a critical state of charge of the battery;

receiving, by battery charging assistance system from the at least partially electrically operated motor vehicle via a first communication network, the charging request and an actual position of the at least partially electrically operated motor vehicle;

determining, by the battery charging assistance system, that a battery charging station at the actual position of the at least partially electrically operated motor vehicle is occupied;

identifying, by the battery charging assistance system, a plurality of battery charging stations at a different position than the actual position and that the at least partially electrically operated motor vehicle can reach with the state of charge of the battery;

choosing, by the battery charging assistance system, one battery charging station out of the plurality of battery charging stations at a location different than the actual position, depending on the actual position and the charging request;

reserving, by the battery charging assistance system, the chosen one battery charging station for a future time corresponding to a time for the at least partially electrically operated motor vehicle to reach the chosen at least one charging station, by transmitting a reservation signal to the one battery charging station via a second communication network;

if the chosen one battery charging station is occupied by an other at least partially electrically operated motor vehicle, a leaving message is computed from the one battery charging station or the battery charging assistance system and the leaving message is transmitted to the other at least partially electrically operated motor vehicle in order to ask the other at least partially electrically operated motor vehicle to leave the chosen one battery charging station; and initiating, by the battery charging assistance system, a compensation action for the other at least partially electrically operated motor vehicle if the other at least partially electrically operated motor vehicle is leaving the chosen one battery charging station wherein a connection sensor of at least the chosen one battery charging station detects a connection or a disconnection of the other motor vehicle at the chosen one battery charging station, wherein a connection status of the chosen one battery charging station is transmitted to the battery charging assistance system, and wherein, depending on the connection status, the compensation action is initiated for the other at least partially electrically operated motor vehicle.

2. The method of claim 1, wherein an actual route of the at least partially electrically operated motor vehicle, which is provided by a navigation device of the at least partially electrically operated motor vehicle, is taken into consideration by choosing the one battery charging station out of the plurality of battery charging stations by the battery charging assistance system.

3. The method of claim 1, wherein the compensation action
   covers a payment for the other at least partially electrically operated motor vehicle,
   is a cheaper charging fee for a current charging or a future charging for the other at least partially electrically operated motor vehicle, or
   is a discount on a system for the battery charging assistance system for the other at least partially electrically operated motor vehicle.

4. The method of claim 1, wherein, after the leaving message is transmitted to the other at least partially electrically operated motor vehicle, a user of the other at least partially electrically operated motor vehicle is asked to confirm the leaving and the confirmation is transmitted to the battery charging assistance system.

5. The method of claim 1, wherein a reservation confirmation is transmitted to the at least partially electrically operated motor vehicle after a reservation of the chosen one battery charging station.

* * * * *